United States Patent [19]

Weir

[11] 3,929,780

[45] Dec. 30, 1975

[54] CEPHALOSPORIN COMPOUNDS

[75] Inventor: Niall Galbraith Weir, London, England

[73] Assignee: Glaxo Laboratories Limited, Greenford, England

[22] Filed: July 18, 1972

[21] Appl. No.: 272,945

[30] Foreign Application Priority Data

July 1, 1971 United Kingdom............... 34268/71

[52] U.S. Cl............ 260/243 C; 260/606.5; 424/246
[51] Int. Cl.²................ C07D 501/20; C07D 501/18
[58] Field of Search ................................ 260/243 C

[56] References Cited
UNITED STATES PATENTS

| | | | |
|---|---|---|---|
| 3,502,665 | 3/1970 | Wetherill et al. | 260/243 C |
| 3,708,480 | 1/1973 | Webber et al. | 210/243 C |

*Primary Examiner*—Nicholas S. Rizzo
*Assistant Examiner*—David E. Wheeler
*Attorney, Agent, or Firm*—Bacon & Thomas

[57] ABSTRACT

A new group of cephalosporin compounds characterized by possessing as 3-position substituent a substituted allyl group.

8 Claims, No Drawings

CEPHALOSPORIN COMPOUNDS

This invention is concerned with improvements in or relating to cephalosporin compounds.

The cephalosporin compounds referred to in this specification are generally named with reference to cepham (see *J. Amer. Chem. Soc.* 1962, 84, 3400). The term "cephem" refers to the basic cepham structure with one double bond. Where a dotted line bridges the 2-, 3- and 4-positions this indicates that the compound may be a ceph-2-em or a ceph-3-em compound.

Our invention is concerned with a novel group of cephalosporin compounds possessing antibacterial activity and which are of value in human and veterinary medicine. The new compounds are characterized by possessing certain substituted allyl groups at the 3-position.

In addition to possessing antibacterial activity in their own right, the compounds are of value in the preparation of other cephalosporin compounds. Thus reactions at centres other than the 3-position may be effected (for example deacylation of a 7-substituent followed by reacylation) as well as reactions at the 3-position (for example reduction of the allylic double bond).

The 3-position substituent may be represented as follows

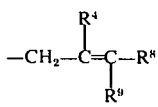

(wherein $R^4$ is an electron withdrawing group and $R^8$ and $R^9$ which may be the same or different are hydrogen atoms or organic substituting groups).

Suitable $R^4$ groups include cyano, lower alkoxycarbonyl (e.g. methoxycarbonyl or ethoxycarbonyl), mono- or di-arylloweralkoxycarbonyl (e.g. diphenyl methoxycarbonyl), carboxyl and acyl.

When either of the groups $R^8$ or $R^9$ are organic groups they may be unsubstituted aliphatic, for example, an alkyl group containing 1–16 carbon atoms, particularly a lower alkyl group containing 1–8 carbon atoms, e.g. a methyl, ethyl, n-propyl, iso-propyl, n-butyl, iso-butyl, sec-butyl, t-butyl, octyl or dodecyl group; cycloaliphatic, for example, a cycloalkyl group containing 3–7 carbon atoms, e.g. a cyclopropyl, cyclopentyl or cyclohexyl group; aromatic, for example, a carbocyclic aryl group, e.g. a phenyl or naphthyl group; or araliphatic, for example, a carbocyclic or heterocyclic aryl lower alkyl group in which the lower alkyl portion contains 1–4 carbon atoms, e.g. a benzyl, phenylethyl, diphenylmethyl, triphenylmethyl or thienylmethyl group; or substituted derivatives of these groups e.g. carrying one or more substituents such as, for example, hydroxy, alkoxy, e.g. methoxy, ethoxy, n-propoxy or iso-propoxy; aryloxy, e.g. phenoxy; aralkoxy, e.g. benzyloxy; mercapto; alkylthio, e.g. methylthio or ethylthio; arylthio; aralkylthio; amino; substituted amino, e.g. methylamino, ethylamino or dimethylamino; halo, e.g. chloro or bromo; nitro; azido; carboxy; esterified carboxy, e.g. lower alkoxycarbonyl such as methoxycarbonyl or ethoxycarbonyl, or benzyloxycarbonyl; formyl; acyl, e.g. acetyl, propionyl or benzoyl; acyloxy e.g. acetoxy, propionyloxy or pivaloyloxy; cyano; phthalimido; acylamido, e.g. acetamido or benzamido; alkoxycarbonylamino, e.g. methoxycarbonylamino or ethoxycarbonylamino; or aralkoxycarbonylamino e.g. benzyloxycarbonylamino. Additionally the groups $R^8$ or $R^9$ may be any of the possibilities listed above for $R^4$.

Compounds according to the invention may be defined by the formula

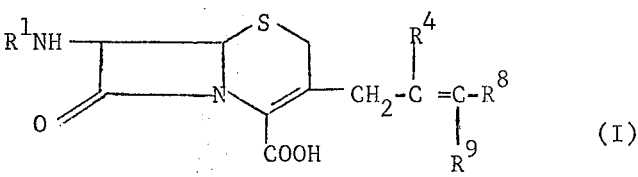

(wherein $R^1$ is a carboxylic acyl group and $R^4$, $R^8$ and $R^9$ have the above defined meaning) and non-toxic derivatives thereof.

Compounds of general formula (I) and non-toxic derivatives thereof, e.g. base salts (where applicable) and acid addition salts (where applicable), are antibiotics having interesting activity. By the term "non-toxic" as applied to the compounds of formula (I), we mean those derivatives which are physiologically acceptable in the dosage at which they are administered.

Salts which may be formed from the compounds according to the invention include (a) inorganic base salts such as alkali metal e.g. sodium and potassium, alkaline earth e.g. calcium, and organic base salts e.g. procaine and dibenzylethylene diamine salts and (b) acid addition salts of any possible basic functions e.g. amino e.g. with hydrochloric, hydrobromic, sulphuric, nitric, phosphoric, toluene-p-sulphonic and methane sulphonic acids. The salts may also be in the form of resinates, formed e.g. with a polystyrene resin containing amino, quaternary amino, or sulphonic acid groups, or a resin containing carboxyl groups, e.g. a polyacrylic acid resin. The resin may if desired be cross-linked, e.g. it may be a copolymer of styrene and divinylbenzene containing the appropriate groups.

The group $R^1$ in formula (I) may represent a wide variety of acyl groups which may contain 1–20 carbon atoms. Specific acyl groups are illustrated in the accompanying list which is not intended to be exhaustive:

i. $R^uC_nH_{2n}CO-$ where $R^u$ is aryl (carbocyclic or heterocyclic), cycloalkyl, substituted aryl, substituted cycloalkyl, cyclohexadienyl, or a non-aromatic heterocyclic or mesoionic group, and n is an integer from 1–4. Examples of this group include phenylacetyl; substituted phenylacetyl e.g. fluorophenylacetyl, nitrophenylacetyl, aminophenylacetyl, acetoxyphenylacetyl, methoxyphenylacetyl, methylphenylacetyl, or hydroxyphenylacetyl; N,N-bis (2-chloroethyl) aminophenylpropionyl; thien-2- and 3-ylacetyl; 4-isoxazolyl and substituted 4-isoxazolylacetyl; pyridylacetyl; tetrazolylacetyl or a sydnoneacetyl group. The substituted 4-isoxazolyl group may be a 3-aryl-5-methyl isoxazol-4-yl group, the aryl group being e.g. phenyl or halo-phenyl e.g. chloro- or bromo- phenyl. An acyl group of this type is 3-o-chlorophenyl-5-methylisoxazol-4-ylacetyl.

ii. $C_nH_{2n+1}CO-$ where n is an integer from 1–7. The alkyl group may be straight or branched and, if desired, may be interrupted by an oxygen or sulphur atom or substituted by e.g. a cyano group, a carboxy group, an alkoxycarbonyl group, a hydroxy group or a carboxycarbonyl group (—CO.COOH). Examples of such groups include cyanoacetyl, hexanoyl, heptanoyl, octanoyl and butylthioacetyl.

iii. $C_nH_{2n-1}CO-$ where n is an integer from 2–7. The alkenyl group may be straight or branched and, if desired, may be interrupted by an oxygen or a sulphur atom. An example of such a group is allylthioacetyl.

iv.

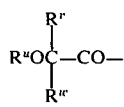

where $R^u$ has the meaning defined under (i) and in addition may be benzyl, and $R^v$ and $R^w$ which may be the same or different each represent hydrogen, phenyl, benzyl, phenethyl or lower alkyl. Examples of such groups include phenoxyacetyl, 2-phenoxy-2-phenylacetyl, benzyloxyacetyl, 2-phenoxypropionyl, 2-phenoxybutyryl, methylthiophenoxyacetyl.

v.

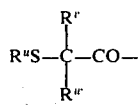

where $R^u$ has the meaning defined under (i) and, in addition, may be benzyl and $R^v$ and $R^w$ have the meanings defined under (iv). Examples of such groups include S-phenylthioacetyl, S-chlorophenylthioacetyl, S-fluorophenylthioacetyl, pyridylthioacetyl, and S-benzylthioacetyl.

vi. $R^uZ(CH_2)_mCO-$ where $R^u$ has the meaning defined under (i) and, in addition, may be benzyl, Z is an oxygen or sulphur atom and m is an integer from 2–5. An example of such a group is S-benzylthiopropionyl.

vii. $R^uCO-$ where $R^u$ has the meaning defined under (i). Examples of such groups include benzoyl, substituted benzoyl (e.g. aminobenzoyl), 4-isoxazolyl- and substituted 4-isoxazolylcarbonyl, cyclopentanecarbonyl, sydnonecarbonyl, naphthoyl and substituted naphthoyl (e.g. 2-ethoxynaphthoyl), quinoxalinylcarbonyl and substituted quinoxalinylcarbonyl (e.g. 3-carboxy-2-quinoxalinylcarbonyl). Other possible substituents for benzoyl include alkyl, alkoxy, phenyl, phenyl substituted by carboxy, alkylamido, cycloalkylamido, allylamido, phenyl(lower)alkylamido, morpholinocarbonyl, pyrrolidinocarbonyl, piperidinocarbonyl, tetrahydropyridino, furfurylamido or N-alkyl-N-anilino, or derivatives thereof, and such substituents may be in the 2- or 2- and 6- positions. Examples of such substituted benzoyl groups are 2,6-dimethoxybenzoyl, 2-methylamidobenzoyl and 2-carboxybenzoyl. Where the group $R^u$ represents a substituted 4-isoxazolyl group, the substituents may be as set out above under (i). Examples of such 4-isoxazolyl groups are 3-phenyl-5-methyl-isoxazol-4-yl carbonyl, 3-o-chlorophenyl-5-methyl-isoxazol-4-yl carbonyl and 3-(2,6-dichlorophenyl)-5-methyl-isoxazol-4-yl carbonyl.

viii.

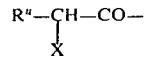

where $R^u$ has the meaning defined under (i) and X is amino, substituted amino (e.g. acylamido or a group obtained by reacting the α-aminoacylamido group of the 7-side chain with an aldehyde or ketone e.g. acetone, methylethylketone or ethyl acetoacetate), hydroxy, carboxy, esterified carboxy, azido, triazolyl, tetrazolyl, cyano, halogeno, acyloxy (e.g. formyloxy or lower alkanoyloxy) or etherified hydroxy group. Examples of such acyl groups are α-aminophenylacetyl, and α-carboxyphenylacetyl.

ix.

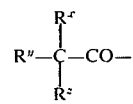

where $R^x$, $R^y$ and $R^z$ which may be the same or different may each represent lower alkyl, phenyl or substituted phenyl or $R^x$ represents hydrogen. An example of such an acyl group is triphenylmethylcarbonyl.

x. $R^u-NH-CO-$ where $R^u$ has the meaning defined under (i) and in addition may be hydrogen, lower alkyl or halogen substituted lower alkyl. An example of such a group is $Cl(CH_2)_2NHCO$.

xi.

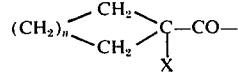

where X has the meaning defined under (viii) above and n is an integer of from 1 to 4. An example of such an acyl group is 1-aminocyclohexanecarbonyl.

xii. Amino acyl, for example $R^wCH(NH_2).(CH_2)_nCO-$ where n is an integer from 1–10, or $NH_2.C_nH_{2n}Ar(CH_2)_mCO$, where m is zero or an integer from 1–10, and n is 0, 1 or 2, $R^w$ is a hydrogen atom or an alkyl, aralkyl or carboxy group or a group as defined under $R^u$ above, and Ar is an arylene group, e.g. p-phenylene or 1,4-naphthylene. Examples of such groups are disclosed in British patent specification No. 1,054,806. A group of this type is the p-aminophenylacetyl group. Other acyl groups of this type include those, e.g. 5-aminoadipoyl, derived from naturally occurring amino acids, and derivatives thereof e.g. N-benzoyl-5-aminoadipoyl.

xiii. Substituted glyoxylyl groups of the formula $R^y$.-CO.CO— where $R^y$ is an aliphatic, araliphatic or aromatic group, e.g. a thienyl group, a phenyl group, or a mono-, di- or tri- substituted phenyl group, the substituents being, for example, one or more halogen atoms (F, Cl, Br, or I), methoxy groups, methyl groups or amino groups, or a fused benzene ring. Included in this group are also the α-carbonyl derivatives of the above substituted glyoxylyl groups e.g. the α-hydroxyimino and α-alkoxyimino derivatives, especially those possessing the syn configuration.

xiv. Formyl.

Where compounds are primarily intended for use as intermediates, important species of the acyl group are:

xv. Hydrocarbyloxycarbonyl and substituted hydrocarbyloxycarbonyl groups (wherein the 7-amino group forms part of a urethane), e.g. lower alkoxycarbonyl groups (such as methoxycarbonyl, ethoxycarbonyl and t-butoxycarbonyl groups); halo lower alkoxycarbonyl groups e.g. 2,2,2-trichloroethoxycarbonyl; aralkoxycarbonyl groups such as benzyloxycarbonyl, 4-methoxybenzyloxycarbonyl, diphenylmethoxycarbonyl and 4-nitrobenzyloxycarbonyl groups; and cycloalkoxycarbonyl groups e.g. adamantyloxycarbonyl.

xvi. Haloformyl e.g. chloroformyl.

An important series of compounds according to the invention are compounds of the general formula

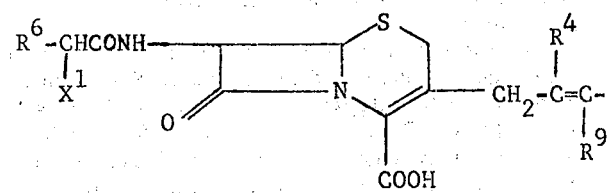

(where $R^6$ is an aromatic group, e.g. phenyl or phenyl substituted with halo, hydroxy, lower alkyl, nitro, amino, lower alkanoyl, lower alkoxy or lower alkylmercapto, or a heterocyclic group (particularly a 5- or 6-membered heterocyclic group containing at least one hetero atom selected from S, N and O, e.g. thien-2-yl or thien-3-yl); $X^1$ is hydrogen, amino, substituted amino (e.g. acylamido), hydroxyl, substituted hydroxyl (e.g. acyloxy) or carboxyl; and $R^4$, $R^8$ and $R^9$ have the above-defined meanings) and nontoxic derivatives thereof.

Compounds of formula (II) possess antibacterial activity against a range of gram positive and gram negative organisms and are of value in human and veterinary medicine.

The compounds of formula (II) or salts thereof, may be used, where $X^1$ is not hydrogen, as a mixture of diastereoisomers or in one of the pure diastereoisomeric forms. Of particular interest are the compounds of the formula (II) wherein the acid $R^6CH(X^1)COOH$ is of the D- series. The derivatives of D(-) phenylglycine and the salts of those derivatives are of especial interest.

A particularly important group of compounds falling within general formula (II) are compounds of the formula:

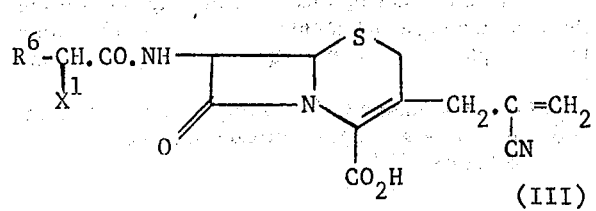

wherein $R^6$ and $X^1$ have the above-defined meanings.

The compound of formula (III) in which $R^6$ is phenyl and $X^1$ is amino, namely, 7β-(D-2-amino-2-phenylacetamido)-3-(2-cyanoallyl)ceph-3-em-4-carboxylic acid is a broad-spectrum antibiotic being active against gram-positive and gram-negative organisms as evidenced by in vitro tests. Additionally, the compound possesses significant absorption an oral administration as evidenced by animal tests.

An important series of compounds related to those of formula (II) wherein $X^1$ is amino are compounds of the formula:

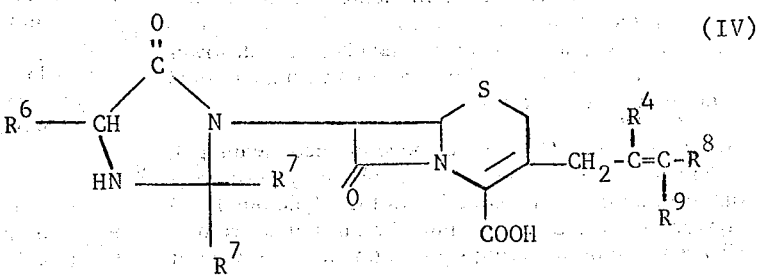

where the $R^7$ groups which may be the same or different are lower alkyl groups ($C_1$–$C_4$), particularly methyl or ethyl, and salts thereof. Such compounds may exist in isomeric forms (cf. J. Org. Chem, 1966, 31, 897) and may be obtained by reaction of the compound of formula (II) wherein $X^1$ is amino with a carbonyl compound of formula $R^7.CO.R^7$ wherein $R^7$ has the above-defined meaning.

Cephalosporin compounds possessing a substituted allyl group at the 3-position may be obtained by coupling a 3-phosphoranylidene ethyl cephalosporin compound with a carbonyl compound of the formula $$R^8.CO.R^9$$

(wherein $R^8$ and $R^9$ have the above-defined meaning).

The invention thus includes a process for the preparation of compounds of the general formula

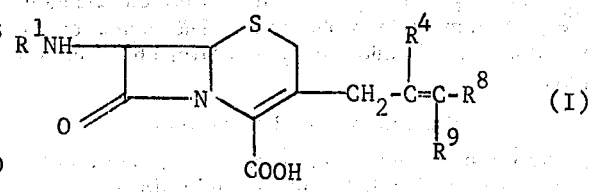

(wherein $R^1$, $R^4$, $R^8$ and $R^9$ have the above-defined meanings) and non-toxic derivatives thereof by (A) coupling a compound of the formula

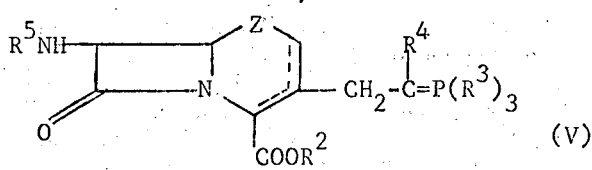

(wherein $R^5$ is a carboxylic acyl group which may be the same as $R^1$, and $R^1$ and $R^4$ have the above-defined meanings; $R^2$ is hydrogen or a carboxyl-blocking group; the $R^3$ groups, which may be the same or different, are each organic groups e.g. $C_3$–$C_{10}$ alkyl, $C_5$- or $C_6$- cycloalkyl, aryl e.g. phenyl or substituted phenyl, or di(lower alkyl) amino; and Z is >S or >S → 0) with a carbonyl compound of the formula $$R^8.CO.R^9$$

(wherein $R^8$ and $R^9$ have the above-defined meanings).

Any of the following reactions (B) may be carried out after coupling (i) reduction of the allylic bond, (ii) conversion of a $\Delta^2$-isomer into the desired $\Delta^3$-isomer, (iii) removal of any groups protecting any carboxyl or amino groups, (iv) reduction of a compound in which Z is >S → 0 to form the desired Z=>S compound and (v) deacylation of a compound in which $R^5$ does not equal $R^1$ to form a 7-amino compound followed by reacylation to introduce the desired 7-$R^1$NH— group. Reactions (ii), (iii), (iv) and (v) may also be carried out before the coupling reaction.

The carbonyl compound may, for example, be an aldehyde of ketone e.g. formaldehyde, acetaldehyde, propionaldehyde, butyraldehyde, glycolaldehyde and glyoxylic esters, for example t-butyl glyoxylate. The resulting cephalosporin compounds may exist, where appropriate as trans and cis isomers. The carbonyl compound is preferably one that does not contain enolizable groups since in this case the coupling reaction may result in the formation of a carbon-oxygen bond rather than the desired carbon-carbon bond.

The coupling reaction may be assisted by the presence of a weak organic acid such as benzoic acid or a weak base such as sodium hydrogen carbonate.

The reaction with the carbonyl compound may be carried out by vigorously stirring the components together, e.g. at a temperature of from −30° to +100°C. When the reaction is effected at a temperature at which one or more reactants may volatilise a closed system may be used. The reaction may be effected in an inert or relatively inert solvent, for example, a halogenated hydrocarbon, e.g. methylene chloride; a hydrocarbon e.g. benzene; an acyclic or cyclic ether e.g. diethyl ether, tetrahydrofuran or dioxan; dimethylsulphoxide; an amide e.g. dimethylformamide or dimethylacetamide or hexamethylphosphoramide. The course of the reaction may be followed by thin layer chromatography.

Protection of carboxyl groups

The group protecting the 4-carboxyl group may be formed with an alcohol (aliphatic or araliphatic), phenol, silanol, stannanol or acid which may readily be split off at a later stage of the reaction.

Suitable esters thus include compounds containing as 4-ester group, a group selected from the following list which is not intended to be an exhaustive list of possible ester groups i. —COOCR"R"R' wherein at least one of R", $R^b$ and $R^c$ is an electron-donor e.g. p-methoxyphenyl, 2,4,6-trimethylphenyl, 9-anthryl, methoxy, acetoxy or fur-2-yl. The remaining R", $R^b$ and $R^c$ groups may be hydrogen or organic substituting groups. Suitable ester groups of this type include p-methoxy benzyloxycarbonyl and 2,4,6-trimethylbenzyloxycarbonyl.

ii. —COOCR"R"R' wherein at least one of R", $R^b$ and $R^c$ is an electron-attracting group e.g. benzoyl, p-nitrophenyl, 4-pyridyl, trichloromethyl, tribromomethyl, iodomethyl, cyanomethyl, ethoxycarbonylmethyl, arylsulphonylmethyl, 2-dimethylsulphoniumethyl, o-nitrophenyl or cyano. The remaining R", $R^b$ and $R^c$ groups may be hydrogen or organic substituting groups. Suitable esters of this type include benzoylmethoxycarbonyl, p-nitrobenzyloxycarbonyl, 4-pyridylmethoxycarbonyl, 2,2,2-trichloroethoxycarbonyl and 2,2,2-tribromoethoxycarbonyl.

iii. —COOCR"R"R' wherein at least two of R", $R^b$ and $R^c$ are hydrocarbon such as alkyl e.g. methyl or ethyl, or aryl e.g. phenyl and the remaining R", $R^b$ and $R^c$ group, if there is one, is hydrogen. Suitable esters of this type include, t-butyloxycarbonyl, t-amyloxycarbonyl, diphenylmethoxycarbonyl and triphenylmethoxycarbonyl.

iv. —COOR$^d$ wherein R$^d$ is adamantyl, 2-benzyloxyphenyl, 4-methylthiophenyl, tetrahydropyran-2-yl or tetrahydrofur-2-yl.

Silyl esters may conveniently be prepared from a halosilane or a silazane of the formula $R^4{}_3SiX$; $R^4{}_2SiX_2$. $R^4{}_3Si.NR^4{}_2$; $R^4{}_3Si.NH.SiR^4{}_3$; $R^4{}_3Si.NH.COR^4$; $R^4{}_3Si.NH.CO.NH.SiR^4{}_3$; $R^4NH.CO.NR^4.SiR^4{}_3$; or $R^4C(OSiR^4{}_3)$: $NSiR^4{}_3$ where X is a halogen and the various groups $R^4$, which can be the same or different, represent hydrogen atoms or alkyl, e.g. methyl, ethyl, n-propyl, iso-propyl; aryl, e.g. phenyl; or aralkyl e.g. benzyl groups.

Preferred derivatives of silanols are silyl chlorides such as for example trimethylchlorosilane and dimethyldichlorosilane.

The carboxyl groups may be regenerated from an ester by any of the usual methods; for example, acid- and base-catalysed hydrolysis (especially for silyl and stannyl esters) is generally applicable, as well as enzymically-catalysed hydrolyses; however, aqueous mixtures may be poor solvents for these compounds and they may cause isomerizations, rearrangements, side-reactions, and general destruction, so that special methods may be desirable. Five suitable methods of deesterification are:

i. Reactions with Lewis acids: Suitable Lewis acids for reaction with the esters include trifluoroacetic acid, formic acid, hydrochloric acid in acetic acid, zinc bromide in benzene and aqueous solutions or suspensions of mercuric compounds. The reaction with the Lewis acid may be improved by addition of a nucleophile such as anisole.

ii. Reduction: Suitable systems for effecting reduction are zinc/acetic acid, zinc/formic acid, zinc/lower alcohol, zinc/pyridine, palladised-charcoal and hydrogen, electrolysis, and sodium and liquid ammonia.

iii. Attack by nucleophiles: Suitable nucleophiles are those containing a nucleophilic oxygen or sulphur atom for example alcohols, mercaptans, thiocyanates and water.

iv. Oxidative methods: for example, those which involve the use of hydrogen peroxide and acetic acid.

v. Irradiation.

Protection of amino groups

When the 7β-acylamido group contains an amino group it may be necessary to protect this during the various reaction stages. The protecting group is conveniently one which can be removed by hydrolysis without effecting the rest of the molecule, especially the lactam and 7β-amido linkages. The amine protecting group and the esterifying group at the 4—COOH position can be removed using the same reagent. An advantageous procedure is to remove both groups at the last stage in the sequence. Protected amine groups include urethane, arylmethyl (e.g. trityl)amino, arylmethyleneamino, sulphenylamino or enamine types. Such groups can in general be removed by one or more reagents selected from dilute mineral acids e.g. dilute hydrochloric acid, concentrated organic acids, e.g. concentrated acetic acid, trifluoroacetic acid, and liquid hydrogen bromide at very low temperature, e.g. −80°C. A convenient protecting group is the t-butoxycarbonyl group, which is readily removed by hydrolysis with dilute mineral acid, e.g. dilute hydrochloric acid, or preferably with a strong acid (e.g. formic acid, trifluoroacetic acid or liquid HF) e.g. at a temperature of 0°–40°C., preferably at room temperature (15°–25°C). Another convenient protecting group is the 2,2,2-trichloroethoxycarbonyl group which may be split off by an agent such as zinc/acetic acid, zinc/formic acid, zinc/lower alcohols or zinc/pyridine. The $NH_2$ group may also be protected as $NH_3^+$.

Typical protecting groups and their methods of removal are illustrated in the following table:

| Type | Example | Usual Name and Analogues etc. | Usual Method of Removal |
|---|---|---|---|
| Urethane | 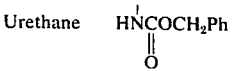 HNCOCH$_2$Ph | Benzyloxycarbonyl, p-Methoxy | HBr/AcOH (Neat) <br> CF$_3$COOH (Neat) <br> Liq. HBr at −80°C |
| Urethane | HNCOC(CH$_3$)$_3$ | t-Butoxycarbonyl | Dil. acid (HCl) <br> CF$_3$COOH (Neat) |
| Urethane | HNCOCHPh$_2$ | Diphenylmethoxycarbonyl | CF$_3$COOH (Neat) <br> Dil. HCl etc. |
| Urethane | HNCO—(1-adamantyl) | 1-Adamantyloxycarbonyl | Dil. HCl |
| Arylmethyl | HNCPh$_3$ | Trityl | AcOH + H$_2$O <br> Dil. HCl |
| Sulphenyl | 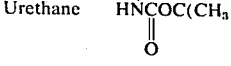 | o-Nitrophenylsulphenyl, p-nitro- | Dil. HCl <br> NaP or <br> Na$_2$S$_2$O$_3$ <br> pH 2–4 |
| Enamine | 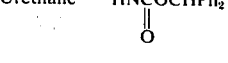 | β-Dicarbonyl <br> R=OEt   Ethyl acetoacetate <br> R=CH$_3$   Acetylacetone <br> R=Ph   Benzoylacetone <br> R=OMe   Methyl acetoacetate <br> R=C$_2$H$_5$   Propionylacetone <br> and many other β-diketones | Acid labile in varying degree <br> Dil. AcOH or HCl etc. |
| Arylmethylene | 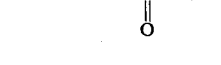 | Anil (similar to β-dicarbonyl) from Salicylaldehyde <br> 5-chlorosalicylaldehyde <br> 3,5-dichlorosalicylaldehyde <br> 2-hydroxy-1-naphthaldehyde <br> 3-hydroxy-pyridine-4-aldehyde | Dil. HCl <br> Formic acid |
| Onium | NH$_3^+$ | | Base |
| Urethane | HN.CO.OCH$_2$CCl$_3$ | β,β,β-trichloroethoxy-carbonyl | Reducing agents e.g. Zn/acetic acid |

There will now be discussed reactions B.

i. Reduction of the allylic bond

The reduction of the allylic group may be effected by any convenient method. The reduction should be so effected as not to cause any substantial saturation of the ceph-3-em or ceph-2-em system or any other undesirable reactions elsewhere in the molecule.

ii. Isomerisation

Where the compound is a ceph-2-em compound, the desired ceph-3-em compound may be obtained by treatment of the former with a base.

iii. De-protection

Removal of any groups protecting any amino or carboxyl groups may be effected as described above.

iv. Reduction of sulphoxide

Where the resultant compound contains a sulphinyl group at the 1-postion this may be reduced by any convenient means. This may, for example, be effected by reduction of the corresponding acyloxysulphonium or alkyloxysulphonium salt prepared in situ by reaction with e.g. acetyl chloride in the case of an acetoxysulphonium salt, reduction being effected by, for example, sodium dithionite or by iodide ion as in a solution of potassium iodide in a water miscible solvent e.g. acetic acid, tetrahydrofuran, dioxan, dimethylformamide or dimethylacetamide. The reaction may be effected at a temperature of −20° to +50°C.

Alternatively, reduction of the 1-sulphinyl group may be effected by phosphorus trichloride or tribromide in solvents such as methylene chloride, dimethylformamide or tetrahydrofuran, preferably at a temperature of −20°C to +50°C.

An advantage associated with the use of a sulphoxide is that the compound will generally be a $\Delta^3$-compound so that an isomerisation as described in (ii) above will not be necessary.

v. N-Deacylation

Where the final product of the above reactions is a $7\beta$-acylamido compound not having the desired acyl group, the $7\beta$-acylamido compound may be N-deacylated to yield the corresponding $7\beta$-amino compound and the latter reacylated with an appropriate acylating reagent.

Suitable methods of N-deacylating cephalosporin derivatives having $7\beta$-acylamido groups are described in British Pat. Nos. 1,041,985 and 1,119,806; Belgian Pat. No. 719,712 and in South African Pat. Nos. 68/5048 and 68/5327. Another method of N-deacylation which may be used is acid catalysis. For example, N-deformylation of a $7\beta$-formamido group may be effected with a mineral acid at a temperature of minus 15° to 100°C, preferably +15° to 40°C. N-deformylation may be effected with the aid of a Lewis acid in a lower alkanol, preferably under substantially anhydrous conditions.

The amino compound so obtained may be acylated by any convenient method. Thus the acylation may be carried out in an aqueous medium with an acid halide, for example in an aqueous solution of a water-miscible ketone such as acetone, or in an aqueous solution of tetrahydrofuran, preferably also in the presence of an acid binding agent. Suitable acid binding agents include tertiary amines such as triethylamine, dimethylformamide, dimethylaniline; inorganic bases such as calcium carbonate or sodium bicarbonate; and oxiranes which bind hydrogen halide liberated in the acylation reaction. The oxirane is preferably a lower-1,2-alkylene oxide e.g. ethylene oxide or propylene oxide.

The pH in the acylation is preferably maintained at from 5 to 7 during the reaction which may be carried out at temperatures of from −30° to +80°C, preferably from 0° to 25°C. The acylation may also be carried out in an organic solvent medium such as ethyl acetate by, for example, refluxing.

Alternatively the acylation may be effected with an acid halide or mixed anhydride under substantially anhydrous conditions in the liquid phase in an inert Lewis base (preferably one having a tertiary nitrogen atom) having a dielectric constant above 15 and preferably above 30 and containing a hydrogen halide acceptor. The reaction may be carried out on the free 4—COOH compound, on an ester thereof or on an acid addition salt e.g. the hydrogen p-toluene-sulphonate of the 4—COOH compound or ester thereof. One may employ an acid addition salt of said ester under the aforesaid anhydrous conditions since this derivative can be obtained in high yield from the N-deacylation step (see above). Thereafter, if desired, the ester group is removed. The acid halide is advantageously the chloride or bromide.

A further alternative technique for effecting acylation is to employ, as acylating agent, an α-aminoarylacetyl chloride having the free amino group protected as an acid addition salt preferable the hydrochloride.

3-Phosphoranylidene ethyl cephalosporin compounds are described and claimed in our Belgian Pat. No. 770,988. Compounds of general formula (V) above may be prepared by reacting a compound of the formula

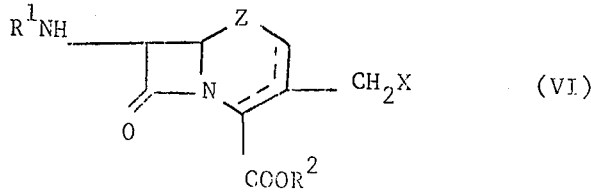

(wherein $R^1$, $R^2$ and Z have the above-defined meanings and X is bromine, iodine or chlorine), with a phosphorus ylid of the formula $(R^3)_3P = CH—R^4$ (wherein $R^3$ and $R^4$ have the above-defined meanings).

The reaction of the compound of formula (VI) with the ylid may be carried out by stirring the components together, e.g. at a temperature of from −80° to +80°C, preferably from −10° to +35°C. When the reaction is effected at a temperature at which one or more reactants may volatilise a closed system may be used. The reaction may be effected in an inert or relatively inert solvent, for example, a halogenated hydrocarbon, e.g. methylene chloride; a hydrocarbon e.g. benzene; an acyclic or cyclic ether e.g. diethyl ether, tetrahydrofuran or dioxan; dimethylsulphoxide; an amide e.g. dimethylformamide or dimethylacetamide; an ester e.g. a lower alkyl alkanoate such as ethyl acetate; or hexamethylphosphoramide.

It is not necessary to isolate the phosphoranylidene ethyl compound prior to the coupling reaction and, if desired, formation of the phosphoranylidene ethyl compound may be effected in situ prior to reaction with the carbonyl compound.

The course of the reaction may also be followed by thin-layer or paper chromatography, by electrophoresis and by spectroscopy.

The present invention also includes within its scope compounds of the general formula

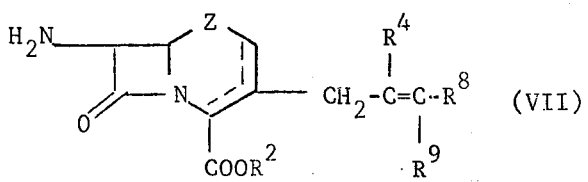

(VII)

where Z, R², R⁴, R⁸ and R⁹ have the above defined meanings and acid addition salts and base salts thereof. Acid addition salts include salts with hydrocarbyl sulphonic acids, e.g. p-toluene sulphonic acid, or nitric acid.

Compounds of formula (VII) may be acylated as described above to yield the desired compound of formula (I), if necessary after employing any of the subsequent transformations (B) described above.

Administration

The compounds according to the invention may be formulated for administration in any convenient way, by analogy with other antibiotics and the invention therefore includes within its scope a pharmaceutical composition comprising a compound of formula (I) or a non-toxic derivative e.g. salt thereof (as herein defined) adapted for use in human or veterinary medicine. Such compositions may be presented for use in conventional manner with the aid of any necessary pharmaceutical carriers or excipients.

The invention therefore provides pharmaceutical compositions comprising a compound of formula (I) or a non-toxic derivative thereof (as herein defined) in association with a pharmaceutical carrier or excipient. The compositions may be presented in a form suitable for absorption by the gastro-intestinal tract. Tablets and capsules for oral administration may be in unit dose presentation form, and may contain conventional excipients such as binding agents, for example syrup, acacia, gelatin, sorbitol, tragacanth, or polyvinylpyrrolidone; fillers, for example lactose, sugar, maize-starch, calcium phosphate, sorbitol or glycine; lubricants, for example, magnesium stearate, talc, polyethylene glycol, silica; disintegrants, for example, potato starch or acceptable wetting agents such as sodium lauryl sulphate. The tablets may be coated according to methods well known in the art. Oral liquid preparations may be in the form of aqueous or oily suspensions, solutions, emulsions, syrups, elixirs, etc. or may be presented as a dry product, for reconstitution with water or other suitable vehicle before use. Such liquid preparations may contain conventional additives such as suspending agents, for example, sorbitol syrup, methyl cellulose, glucose/sugar syrup, gelatin, hydroxyethylcellulose, carboxymethyl cellulose, aluminium stearate gel or hydrogenated edible fats; emulsifying agents, for example, lecithin, sorbitan mono-oleate or acacia; non-aqueous vehicles which may include edible oils, for example, almond oil, fractionated coconut oil, oily esters, propylene glycol, or ethyl alcohol; preservatives, for example, methyl or propyl p-hydroxybenzoates or sorbic acid. Suppositories will contain conventional suppository bases, e.g. cocoa butter or other glyceride.

Compositions for injection may be presented in unit dose form in ampoules, or in multidose containers with an added preservative. The compositions may take such forms as suspensions, solutions, emulsions in oily or aqueous vehicles, and may contain formulatory agents such as suspending, stabilising and/or dispersing agents. Alternatively the active ingredient may be in powder form for reconstitution with a suitable vehicle, e.g. sterile, pyrogen-free water, before use.

The compositions may also be prepared in suitable forms for absorption through the mucous membranes of the nose and throat or bronchial tissues and may conveniently take the form of powder or liquid sprays or inhalants, lozenges, throat paints etc. For medication of the eyes or ears, the preparations may be presented as individual capsules, in liquid or semi-solid form, or may be used as drops etc. Topical applications may be formulated in hydrophobic or hydrophilic bases as ointments, creams, lotions, paints, powders etc.

For veterinary medicine the composition, may, for example, be formulated as an intramammary preparation in either long acting or quick-release bases.

The compositions may contain from 0.1% upwards, preferably from 10–99% of the active material, depending on the method of administration. Where the compositions comprise dosage units, each unit will preferably contain 50–500 mg. of the active ingredient. The dosage as employed for adult human treatment will preferably range from 100–3000 mg. for instance 1500 mg. per day, depending on the route and frequency of administration.

The compounds according to the invention may be administered in combination with other therapeutic agents such as antibiotics, for example other cephalosporins, the penicillins or tetracyclines.

The following examples illustrate the invention. In the Examples:

System B is n-butanol: ethanol:water = 4:1:5, equilibrated at room temperature, the upper phase being used as developer in descending manner, in equilibrium with lower phase, on Whatman No. 1 paper buffered to pH 6 with 0.05M sodium dihydrogen phosphate.

System C is ethyl acetate: n-butanol: 0.IM-sodium acetate pH 5 = 8:1:8. equilibrated at 38°C, the upper phase being used as developer in descending manner, in equilibrium with lower phase at 38°, on No. 1 Whatman paper buffered to pH 5 with 0.1M sodium acetate.

Light petroleum was the fraction, b.p. 40° to 60°. Methylene chloride was dried and deacidified on Woelm Grade I basic alumina. Thin-layer chromatography was carried out upwards on Merck silica plates.

Nmr spectra were measured at 60 and 100 Mhz. Signs of the coupling constants were not attributed.

As far as possible, analytical values for solvates were confirmed by inspection for the appropriate features in the spectra.

The conditions for electrophoresis are those described in Cocker et al., J. Chem. Soc. 1965, 5015.

Organic solutions were dried over desiccated magnesium sulphate.

EXAMPLE 1 a. t-Butyl 3-(2-Cyanoallyl)-7β-(2-thienylacetamido) ceph-3-em-4-carboxylate i. A solution of t-butyl 3-iodomethyl-7β-(2-thienylacetamido)ceph-3-em-4-carboxylate (2.08 g.) in dry, acid free methylene dichloride (20 ml.) was treated with a solution of cyanomethylenetriphenylphosphorane (2.41 g., 2 equiv.), and the mixture kept in the dark at 20° for 18 hours. The solution was washed with water, and the separated organic phase treated with 40%-aqueous formaldehyde solution (16 ml.) and 2½%-aqueous sodium bicarbonate solution (40 ml.). The two phase system was stirred vigorously at 20° for 3 hours. The organic layer was separated, and washed with water, and dried, and evaporated in vacuo. The residue, in benzene, was run on to a column of Merck Kieselgel (60 g.) and the column eluted with benzene:ethyl acetate = 4:1. Fractions containing material with similar mobilities on T.L.C. (Rf 0.3 in benzene:ethyl acetate = 5:1) were combined and evaporated in vacuo.The vacuo. The in ethyl acetate, was run into vigorously stirred petroleum ether to give the title compound (1.0 g.), as an amorphous solid, m.p. ca 55°, $[\alpha]_D^{27} + 20.5°$ (c 0.8, $CHCl_3$), λinflex (EtOH) 261 nm. (ε 7,130), $\nu_{max}$. ($CHBr_3$) 3440 (NH), 2240 (CN), 1784 (β-lactam), 1720 ($CO_2R$), 1688 and 1514 (CONH), and 940 ($C=CH_2$) cm.$^{-1}$, 196 ($CDCl_3$), 2.74 and 3.02 (thienyl), 3.34 (NH, doublet, J 9 Hz.), 4.02 and 4.18 ($C=CH_2$, two singlets), 4.2 ($C_{(7)}$—H, double doublet, J 4.5 and 9 Hz.), 5.03 ($C_{(6)}$—H, doublet, J 4.5 Hz.), 6.17 ($CH_2CO$), 6.58 ($CH_2C=CH_2$), 6.48 and 6.83 ($C_{(2)}$—$CH_2$, AB-quartet, $J_{AB}$ 18 Hz.), and 8.48 (t-butyl) (Found: C, 56.0; H, 5.2; N, 9.2; S, 14.2. $C_{21}H_{23}N_3O_4S_2$ requires C, 56.6; H, 5.2; N, 9.45; S, 14.4%).

ii. A solution of t-butyl 3-bromomethyl-7β-(2-thienylacetamido)ceph-3-em-4-carboxylate (3.55 g., ca 7.5 mmole) in dry, acid-free, methylene dichloride (25 ml.) was treated with a solution of cyanomethylenetriphenylphosphorane (4.5 g., ca 15.2 mmole.) in methylene dichloride (25 ml.) and the mixture kept overnight, in the dark at 25°. The mixture was treated with 40%-aqueous formaldehyde (30 ml.) and 2½%-aqueous sodium bicarbonate solution (95 ml.) and the two-phase system was stirred vigorously overnight. The organic layer was separated and treated as above. The material obtained was chromatographed on Merck Kieselgel (110 g.) as above to give the title compound (1.27 g.) as a pale-yellow foam, $[\alpha]_D^{25} + 21.65°$ (c 1.6, $CHCl_3$), λinflex. (EtOH) 261 nm. (ε 6,750), the infrared and p.m.r. spectra were similar to those of the compound described above.

b.
3-(2-Cyanoallyl)-7β-(2thienylacetamido)ceph-3-em-4-carboxylic Acid

A solution of t-butyl 3-(2-cyanoallyl)-7β-(2-thienylacetamido)ceph-3-em-4-carboxylate (900 mg.) in anisole (0.9 ml.) with trifluoroacetic acid (3.6 ml.) was kept at 23° for 10 minutes. The solvents were removed in vacuo and the residue partitioned between ethyl acetate and dilute aqueous sodium bicarbonate solution. The aqueous phase was washed with ethyl acetate and ether then acidified with N-hydrochloric acid and the liberated acid extracted into ethyl acetate. The organic phase was washed with water, and dried, and evaporated in vacuo. The residue, in ethyl acetate was run into vigorously stirred petroleum to give the title acid (510 mg.) as an amorphous solid, m.p. ca 80° (frothing), $[\alpha]_D^{27} + 56.7°$ (c 1.2, dioxan), λinflex. (0.1M – pH 6 phosphate buffer) 260 nm. (ε 7,900), $\nu_{max}$. (Nujol) ca 3500 ($H_2O$), 3300 (NH) 2216 (CN), 1775 (β-lactam), 1715 ($CO_2H$) and 1660 and 1525 (CONH) cm.$^{-1}$, τ (DMSO-$d_6$) 0.84 (NH, doublet, J 9 Hz.), 2.62 and 3.02 (thienyl), 3.85 and 4.02 ($C=CH_2$, two singlets), 4.31 ($C_{(7)}$—H, double doublet, J 4.5 and 9 Hz.), 4.86 ($C_{(6)}$—H, doublet, J 4.5 Hz.), 6.22 ($CH_2CO$), 6.35 and 6.64 ($C_{(2)}$—$CH_2$, AB-quartet, $J_{AB}$ 18 Hz.) and 6.5 ($CH_2C=CH_2$) (Found: C, 50.9; H, 4.2; N, 10.1; S, 15.4. $C_{17}H_{15}N_3O_4S_2$, ½$H_2O$ requires C, 51.2; H, 4.05; N, 10.55; S, 16.1%). Rf. 0.46 (System C), 0.63 (System B).

EXAMPLE 2 a. t-Butyl 3-(2-Methoxycarbonylallyl)-7β-(2-thienylacetamido)-ceph-3-em-4-carboxylate A solution of t-butyl 3-iodomethyl-7β-(2-thienylacetamido)ceph-3-em-4-carboxylate (10.4 g., ca 20 mmole.) in methylene dichloride (50 ml.) was treated with a solution of methoxycarbonylmethylenetriphenylphosphorane (13.7 g., ca 41 mmole.) in methylene dichloride and the mixture kept at 17° overnight in the dark. The solution was washed with water and the separated organic phase treated with 40%-aqueous formaldehyde (80 ml.) and 2½-aqueous sodium bicarbonate solution (250 ml.). The two-phase system was stirred vigorously at 17° for 7 hours. The organic layer was separated, and washed with water (2 × 100 ml.), and dried, and evaporated in vacuo. The residual foam, in benzene, was run on to a column of Merck Kieselgel (300 g.) and the column eluted with benzene:ethyl acetate = 4:1. Fractions containing material with similar mobilities on T.L.C. (Rf. 0.6 in benzene:ethyl acetate = 2:1) were combined and evaporated in vacuo. The residue was crystallised from ether-petroleum to give the title compound (7.23 g., 75.7%) as needles, m.p. 105° to 106° (decomp.) $[\alpha]_D^{17} + 29.77°$ (c 1.6, $CHCl_3$), λinflex. (EtOH) 265 nm (ε 7,250), $\nu_{max}$. ($CHBr_3$) 3430 (NH), 1780 (β-lactam), 1715 ($CO_2R$), and 1685 and 1510 (CONH) cm.$^{-1}$, τ ($CDCl_3$) 2.7 and 3.0 (thienyl), 3.43 (NH, doublet, J 9 Hz.), 3.71 and 4.41 ($C=CH_2$, two singlets), 4.21 ($C_{(7)}$—H, double doublet, J 5 and 9 Hz.), 5.03 ($C_{(6)}$—H, doublet, J 5 Hz.), 6.18 ($CH_2CO$), 6.55 ($CH_2C=CH_2$), 6.56 and 6.89 ($C_{(2)}$—$CH_2$, AB-quartet, $J_{AB}$ 18 Hz.) and 8.50 (t-butyl) (Found: C, 55.4; H, 5.5; N, 5.9; S, 13.5. $C_{22}H_{26}N_2O_6S_2$ requires C, 55.3; H, 5.3; N, 5.9; S, 13.4%).

b. (i) 3-(2-Methoxycarbonylallyl)-7β-(2-thienylacetamido)-ceph-3-em-4-carboxylic Acid A solution of t-butyl 3-(2-methoxycarbonylallyl)-7β-(2-thienylacetamido)ceph-3-em-4-carboxylate (1.15 g.) in anisole (1.15 ml.) with trifluoroacetic acid (4.6 ml.) was kept at 20° for 10 minutes. The solvents were removed in vacuo and the residue partitioned between ethyl acetate and dilute aqueous sodium bicarbonate solution. The aqueous phase was washed with ethyl acetate and taken to pH 1 with concentrated hydrochloric acid, and the liberated acid extracted into ethyl acetate (50 ml.). The organic phase was washed with water (3 × 10 ml.) and dried and evaporated in vacuo. The residual foam (961 mg.) was crystallised from ethyl acetate to give the acid (407 mg.), in two crops, as needles, m.p. 146° to 147°, $[\alpha]_D^{20} + 76.4°$ (c 0.8, acetone), $\lambda_{max}$. (0.1M pH 6 phosphate buffer) 261 nm. (ε 8,750), $\nu_{max}$. ($CHBr_3$) 3420 (NH), 1785 (β-lactam), 1720 ($CO_2R$) and 1686 and 1515 (CONH) cm.$^{-1}$, τ ($CDCl_3$) 1.99 (NH, doublet, J 8.5 Hz.), ca 2.68 and 3.09 (thienyl), 3.71 and 4.39 ($C=CH_2$, two singlets), 4.29 ($C_{(7)}$—H, double doublet, J 4.5 and 8.5 Hz.), 5.02 ($C_{(6)}$—H, doublet, J 4.5 Hz), 6.19 ($CH_2CO$), 6.27 ($CO_2CH_3$), 6.32 and 6.60 ($CH_2C=CH_2$, AB-quartet, $J_{AB}$ 15 Hz.) and 6.51 and 6.89 ($C_{(2)}$—$CH_2$, AB-quartet, $J_{AB}$ 18 Hz.) (Found: C, 51.2; H, 4.25; N, 6.4; S, 14.9. $C_{18}H_{18}N_2O_6S_2$ requires C, 51.15; H, 4.3; N, 6.6; S, 15.15%).

b. (ii) t-Butyl 7β-Amino- 3-(2-methoxycarbonylallyl) ceph-3-em-4-carboxylate

A solution of phosphorus pentachloride (473 mg., ca 2.25 mmoles) in warm, dry methylene dichloride (4ml.) was cooled to 0° and treated with pyridine (1.82 ml. of a 10%-solution in methylene dichloride, ca 2.25 mmoles). A solution of t-butyl 3-(2-methoxycarbonylallyl)-7β-(2-thienylacetamido)ceph3-em-4-carboxylate (477 mg. 1 mmole) in dry methylene dichloride (2 ml.) was added, with stirring, to the above mixture at 0°. The mixture was stirred at 21° for 70 minutes, then run into a solution of methanol (1 ml.) in methylene dichloride (2.5 ml.) at 0°. The organic mixture was treated with nitric acid (0.77 ml of a mixture of water:concentrated nitric acid = 3:1, ca 1 equiv.) in an attempt to isolate the amine as its hydronitrate. An additional 3 equivalents of aqueous nitric acid were added but no salt was precipitated. The aqueous phase was separated and made alkaline with saturated aqueous sodium bicarbonate solution and the mixture extracted with methylene dichloride. The organic extracts were washed with water, and dried, and evaporated. Trituration of the residue with ether gave the amine (84 mg.) as a pale-yellow solid, m.p. ca 90°, $[\alpha]_D^{21}$ + 2.4° (c 1.5, CHCl$_3$), $\lambda_{max.}$ (EtOH) 268.5 nm. ($\epsilon$ 8,880), $\nu_{max.}$ (CHBr$_3$) 3360 (NH$_2$), 1758 (β-lactam) and 1700 (CO$_2$R) cm.$^{-1}$, $\tau$ (CDCl$_3$) 3.69 and 4.38 (C=CH$_2$, two singlets), 5.04 and 5.28 (C$_{(6)}$—, and C$_{(7)}$—H, two doublets, J 4.5 Hz.), 6.23 (CO$_2$CH$_3$), 6.58 (CH$_2$C=CH$_2$), 6.87 and 6.52 (C$_{(2)}$—CH$_2$, AB-quartet, J$_{AB}$ 18 Hz.), 8.18 (NH$_2$), and 8.47 (t-butyl).

EXAMPLE 3 a. t-Butyl 3-(2-Ethoxycarbonylallyl)-7β-(2-thienylacetamido)-ceph-3-em-4-carboxylate A solution of t-butyl 3-(2-ethoxycarbonyl-2-triphenylphosphoranylideneethyl)- 7β-(2-thienylacetamido)ceph-3-em-4-carboxylate (2.08 g, 2.8 mmole.) in methylene dichloride (30 ml.) was treated with 40%-aqueous formaldehyde (10 ml.) and 2½%-aqueous sodium bicarbonate (10 ml.), and the two-phase system stirred vigorously at 23° for 2¼ hours. The organic phase was separated and washed with 2N-hydrochloric acid, and water, and dried and evaporated in vacuo. The residue was chromatographed on Merck Kieselgel 80 g.) with benzene:ethyl acetate = 2:1 as eluent. Fractions containing material with similar mobilities on T.L.C. (Rf 0.75 in benzene:ethyl acetate = 2:1) were combined and evaporated in vacuo to give the title compound (1.35 g. 97 %) as an amorphous solid, m.p. 48° to 55°, $[\alpha]_D^{23}$ + 23° (c 1.5, CHCl$_3$), $\lambda$inflex 263 nm. ($\epsilon$ 7,250), $\nu_{max.}$ (CHBr$_3$) 3420 (NH), 1780 (β-lactam), 1713 (CO$_2$R), and 1683 and 1514 (CONH) cm.$^{-1}$, $\tau$ (CDCl$_3$) 2.71 and 3.0 (thienyl), 3.49 (NH, doublet, J 9 Hz.), 3.7 and 4.41 (C=CH$_2$, two singlets), 4.19 (C$_{(7)}$—H, double doublet, J 4.5 and 9 Hz.), 5.01 (C$_{(6)}$—H, doublet, J 4.5 Hz.), 5.76 and 8.69 (CO$_2$CH$_2$CH$_3$, AB-quartet and triplet respectively, J 7 Hz.), 6.14 (CH$_2$CO), 6.53 (CH$_2$C=CH$_2$), 6.54 and 6.87 (C$_{(2)}$—CH$_2$, AB-quartet, J$_{AB}$ 18 Hz.) and 8.48 (t-butyl) (Found: C, 56.0; H, 5.7; N, 5.3; S, 12.6. C$_{23}$H$_{28}$N$_2$O$_6$S$_2$ requires C, 56.05; H, 5.7; N, 5.7; S, 13.0%).

b. 3-(2-Ethoxycarbonylallyl)-7β-(2-thienylacetamido)-ceph-3-em-4-carboxylic acid A solution of t-butyl 3-(2-ethoxycarbonylallyl)-7β-(2-thienylacetamido)ceph-3-em-4-carboxylate (870 ml.) in anisole (0.87 ml.) with trifluoroacetic acid (3.5 ml.) was kept at 20° for 5 minutes. The solvents were removed in vacuo and the residue partitioned between ethyl acetate and aqueous sodium bicarbonate solution. The aqueous phase was washed with ethyl acetate and acidified with 2N-hydrochloric acid, and the liberated acid extracted into ethyl acetate (50 ml.). The organic phase was washed with water (2 × 15 ml.), and dried and evaporated in vacuo. The residue was crystallised from ethyl acetate-ether to give the title acid (380 mg.) as needles, m.p. 160° to 161°, $[\alpha]_D^{20.5°}$ + 22.05° (c 1.5, CHCl$_3$), $\lambda_{max.}$ (0.1M- pH 6 phosphate buffer) 260 nm. ($\epsilon$ 8,300), $\nu_{max.}$ (CHBr$_3$) 3405 (NH), 1782 (β-lactam), 1740 (CO$_2$H), 1705 (CO$_2$R), and 1690 and 1512 (CONH) cm.$^{-1}$, $\tau$ (DMSO-d$_6$) 0.90 (NH, doublet, J 9 Hz.), 2.6 and 3.0 (thienyl), 3.79 and 4.39 (C=CH$_2$, two singlets), 4.33 (C$_{(7)}$—H, double doublet, J 4.5 and 9 Hz.), 4.88 (C$_{(6)}$—H, doublet J 4.5 Hz.) 6.23 (CH$_2$CO), 6.40 and 6.77 (C$_{(2)}$—CH$_2$, AB-quartet, J$_{AB}$ 18 Hz.), 6.42 and 6.75 (CH$_2$C=CH$_2$, AB-quartet, J$_{AB}$ 15 Hz.), 8.78 and 5.83 (CO$_2$CH$_2$CH$_3$, triplet and quartet respectively, J 7 Hz.) (Found: C, 52.1; H, 4.7; N, 6.3; S, 14.4 C$_{19}$H$_{20}$N$_2$O$_6$S$_2$ requires C, 52.2; H, 4.3; N, 6.4; S, 14.7%).

EXAMPLE 4 a. t-Butyl 3-(2-Diphenylmethoxycarbonylallyl)-7β-(2-thienylacetamido)ceph-3-em-4-carboxylate A solution of t-butyl 3-iodomethyl-7β-(2-thienylacetamido)ceph-3-em-4-carboxylate (2.08 g.) in dry acid-free methylene dichloride (20 ml.) was treated with a solution of diphenylmethoxymethylene-triphenylphosphorane (4.3 g. ca 2:1 equiv.) in methylene dichloride (20 ml.), and the mixture was kept at 20° for 18 hours in the dark. The solution was washed with water (2 × 50 ml.) and treated with 40%-aqueous formaldehyde solution (16 ml.) and 2½-aqueous sodium bicarbonate solution (50 ml.). The two-phase system was stirred vigorously for 3½ hours. The organic layer was separated and washed with water, and 2N-hydrochloric acid and more water, and dried and evaporated in vacuo. The residue, in benzene, was run on to a column of Merck Kieselgel (60 g.) and the column eluted with benzene:ethyl acetate = 4:1. Fractions containing material with similar mobilities on T.L.C. (Rf 0.5 in benzene:ethyl acetate = 5:1) were combined and evaporated in vacuo. A solution of the resulting foam, in ether, was run into vigorously stirred petroleum ether to give the title compound (1.5 g, 59%) as an amorphous solid, m.p. ca 65°, $[\alpha]_D^{27}$ + 14.3° (c 0.8, CHCl$_3$), $\lambda$inflex. (EtOH) 265 nm ($\epsilon$ 7,950), $\nu_{max.}$ (CHBr$_3$) 3420 (NH), 1784 (β-lactam), 1716 (CO$_2$R) and 1682 and 1516 (CONH) cm.$^{-1}$, $\tau$ (CDCl$_3$) 2.55 (Ph), 2.76 and 3.03 (thienyl), 3.05 (CHPh$_2$), 3.52 (NH, doublet, J 9 Hz.) 3.56 and 4.35 (C=CH$_2$, two singlets), 4.23 (C$_{(7)}$—H, double doublet, J 4.5 and 9 Hz.), 5.22 (C$_{(6)}$—H, doublet, J 4.5 Hz.), 6.19 (CH$_2$CO), 6.40 and 6.63 (CH$_2$C=CH$_2$, AB-quartet, J$_{AB}$ 16 Hz.), 6.64 and 6.96 (C$_{(2)}$—CH$_2$, AB-quartet, J$_{AB}$ 18 Hz.), and 8.52 (t-butyl) (Found: C, 64.5; H, 5.4; N, 4.3; S, 9.9. C$_{34}$H$_{34}$N$_2$O$_6$S$_2$ requires C, 64.3; H, 5.4; N, 4.45; S, 10.15%).

b. 3-(2-Carboxyallyl)-7β-(2-thienylacetamido) ceph-3-em-4-carboxylic acid

A solution of t-butyl 3-(2-diphenylmethoxycarbonylallyl)-7β-(2-thienylacetamido)ceph-3-em-4-carboxylate (1.25 g.) in anisole (1.0 ml.) with trifluoroacetic acid (6.4 ml.) was kept at 23° for 10 minutes. The solvents were removed in vacuo and the residue partitioned between ethyl acetate and dilute aqueous sodium bicarbonate solution. The aqueous phase was washed with ethyl acetate and acidified with N-hydrochloric acid, and the liberated acid extracted into ethyl acetate. The organic extracts were washed with water, and dried and evaporated in vacuo. The residue was triturated with other to give the title acid (450 mg.) as an amorphous solid, m.p. 142° to 145° (decomp.), $[\alpha]_D^{27}$ + 85.4° (c 0.9, dioxan: MeOH=2:1), λinflex. (0.1 M-pH 6 phosphate buffer) 259 (ε 8.250), $\nu_{max}$. (Nujol) 3265 (NH), 1755 (β-lactam), 1685 and 1535 (CONH) and 1610 ($CO_2H$) cm.$^{-1}$, τ (DMSO-$d_6$) 0.86 (NH, doublet, J 9 Hz.), 2.61 and 3.00 (thienyl), 3.82 and 4.46 (C=$CH_2$, two singlets), 4.34 ($C_{(7)}$—H, double doublet, J 4.5 and 9 Hz.), 4.87 ($C_{(6)}$—H, doublet, J 4.5 Hz.), 6.21 ($CH_2CO$), 6.42 and 6.72 ($C_{(2)}$—$CH_2$, AB-quartet, $J_{AB}$ 18 Hz.), and 6.44 and 6.69 ($CH_2C$=$CH_2$, AB-quartet, $J_{AB}$ 16 Hz.) (Found: C, 50.2; H, 4.1; N, 6.3; S, 15.6. $C_{17}H_{16}N_2O_6S_2$ requires C, 49.95; H, 3.95; N, 6.85; S, 15.7%).

EXAMPLE 5 a. t-Butyl 7β-(D-2-t-Butoxycarbonylamino-2-phenylacetamido)-3-(2-methoxycarbonylallyl)ceph-3-em-4-carboxylate A solution of t-butyl 7β-(2-t-butoxycarbonylamino-2-phenylacetamido)-3-iodomethylceph-3-em-4-carboxylate (4.72 g., 75 mmole.) in dry, acid-free, methylene dichloride (20 ml.) was treated with a solution of methoxycarbonylmethylenetriphenylphosphorane (5.04 g, 15.2 mmole.) in methylene dichloride (20 ml.) and the mixture kept at 20° overnight in the dark. The solution was washed with water and the separated organic phase treated with 40%-aqueous formaldehyde solution (30 ml.) and 2½-aqueous sodium bicarbonate solution (95 ml.). The two-phase system was stirred vigorously, at 20°, for 6 hours. The organic layer was separated and washed with water (2 × 20 ml.), and brine (20 ml.), and dried and evaporated in vacuo. The residual foam, in benzene, was run into a column of Merck Kieselgel (152 g.) and the column eluted with benzene:ethyl acetate = 4:1. Fractions containing material with similar mobilities on T.L.C. (Rf 0.75, benzene:ethyl acetate = 3:1) were combined and evaporated in vacuo. A solution of the resulting foam (1.55 g.), in ether, was run into vigorously stirred petroleum ether to give the title compound (1.18 g., 27.5%) as an amorphous solid, m.p. ca 90° (decomp.), $[\alpha]_D^{20}$ ± 0° (c 1.5, $CHCl_3$), $\lambda_{max}$. (EtOH) 261 nm. (ε 7,300), $\nu_{max}$. ($CHBr_3$) 3390 (NH), 1778 (β-lactam), 1715 ($CO_2R$), 1708 and 1510 ($NHCO_2R$), and 1690 and 1510 (CONH) cm.$^{-1}$, τ ($CDCl_3$) 2.66 (Ph), 3.17 (NH, doublet, J 9 Hz.), 3.76 and 4.48 (C=$CH_2$, two singlets), 4.24 ($C_{(7)}$—H, double, doublet, J 4.5 and 9 Hz.), 4.30 (CHNH, doublet, J 7 Hz.) 4.81 (CHNH, doublet, J 7 Hz.), 5.11 ($C_{(6)}$—H, doublet, J 4.5 Hz.), 6.27 ($CO_2CH_3$), 6.6 ($CH_2C$=$CH_2$), 6.65 and 7.01 ($C_{(2)}$—$CH_2$, AB-quartet, $J_{AB}$ 18 Hz.) and 8.53 and 8.62 (t-butyls) (Found: C, 58.5; H, 6.2; N, 7.1; S, 5.3. $C_{29}H_{38}N_3O_8S$ requires C, 59.2; H, 6.5; N, 7.15; S, 5.45%).

b. 7β-(D-2-Amino-2-phenylacetamido)-3-(2-methoxycarbonylallyl)ceph-3-em-4-carboxylic Acid, Trifluoroacetic Acid Salt A solution of t-butyl 7β-(D-2-t-butoxycarbonylamino-2-phenylacetamido)-3-(2-methoxycarbonylallyl) ceph-3-em-4-carboxylate (1.2 g) in trifluoroacetic acid (5.0 ml.) was kept at 21° for 10 minutes. The solvent was removed in vacuo and the residue partitioned between ethyl acetate and dilute aqueous trifluoroacetic acid. The aqueous phase was washed with ether and, after removal of traces of ether in vacuo, freeze-dried to give the title compound (930 mg, 83%) as a white amorphous solid, m.p. ca 115° (decomp.), $[\alpha]_D^{27}$ + 20.24° (c 0.8, acetone), $\lambda_{max}$. (0.1 M- pH 6 phosphate buffer) 263.5 nm. (ε 8,950), $\nu_{max}$. (Nujol) 3500 ($H_2O$), ca 2630 ($NH_3^+$), 1770 (β-lactam), 1705 (C=C—$CO_2R$ and $CO_2H$), 1680 ($CF_3CO_2^-$) and ca 1680 and 1530 (CONH) cm.$^{-1}$, τ ($CF_3CO_2H$) 2.16 ($NH_3^+$ and NH), 2.42 (Ph), 3.46 and 4.14 (C=$CH_2$, two singlets), 4.17 ($C_{(7)}$—H, double doublet, J 4.5 and 9 Hz.), 4.44 ($CHNH_3^+$, ill-resolved AB-quartet), 4.74 ($C_{(6)}$—H, doublet, J 9 Hz.), 6.06 ($CO_2CH_3$), 6.24 ($CH_2C$=$CH_2$), and 6.46 and 6.72 ($C_{(2)}$—$CH_2$, AB-quartet $J_{AB}$ 18 Hz.). (Found: C, 46.8; H, 4.15; F, 9.85; N, 7.4; S, 5.8. $C_{22}H_{23}F_3N_3O_8S$, $H_2O$ requires C, 46.9; H, 4.3; F, 10.1; N, 7.45; S, 5.7%).

EXAMPLE 6 a. t-Butyl 7β-(D-2-t-Butoxycarbonylamino-2-phenyl acetamido)-3-(2-cyanoallyl)ceph-3-em-4-carboxylate A solution of t-butyl 3-bromomethyl-7β-(D-2-t-butoxycarbonylamino-2-phenylacetamido)ceph-3-em-4-carboxylate (4.69 g., ca 7.5 mmole.) in dry, acid-free, methylene dichloride (20 ml.) was treated with a solution of cyanomethylenetriphenyl phosphorane (4.81 g. ca 15.2 mmole.) in methylene dichloride (20 ml.) and the mixture kept at 20° overnight in the dark. The solution was washed with water and the separated organic phase treated with 40%-aqueous formaldehyde solution (30 ml.) and 2½%-aqueous sodium bicarbonate solution (95 ml.). The two-phase system was stirred vigorously, at 20°, for 6 hours. The organic layer was separated and washed with water (2 × 20 ml.), and brine (20 ml.), and dried, and evaporated in vacuo. The residual foam, in benzene, was run on to a column of Merck Kieselgel (150 g) and the column eluted with benzene:ethyl acetate = 4:1. Fractions containing material with similar mobilities on T.L.C. (Rf ca 0.4 in benzene:ethyl acetate = 5:1) were combined and evaporated in vacuo. A solution of the resulting pale-yellow foam (2.13 g.), in ether, was run into vigorously stirred petroleum ether to give the title compound (1.72 g., 41.4%) as an amorphous white solid, m.p. 102° to 107° (decomp.), $[\alpha]_D^{20}$ − 5.97° (c 1.5, $CHCl_3$), $\lambda_{max}$. (EtOH) 263 nm. (ε 6,600), $\nu_{max}$. ($CHBr_3$) 3420 (NH), 2240 (CN), 1789 (β-lactam), 1719 ($CO_2R$) and 1700 and 1500 (CONH) cm.$^{-1}$, τ ($CDCl_3$) 2.64 (Ph), 3.20 (NH, doublet, J 9 Hz.), 4.04 and 4.22 (C=$CH_2$, two singlets), 4.20 ($C_{(7)}$—H, double doublet, J 4.5 and 9 Hz.), 4.33 (CHNH, doublet, J 7 Hz.), 4.79 (CHNH, doublet, J 7 Hz.), 5.06 ($C_{(6)}$—H, doublet, J 4.5 Hz.), 6.55 and 6.92 ($C_{(2)}$—$CH_2$, AB-quartet, $J_{AB}$ 18 Hz.), 6.62 ($CH_2$—C=$CH_2$) and 8.49 and 8.58 (t-butyls) (Found: C, 59.9; H, 6.1; N, 9.75; S, 5.8. $C_{28}H_{34}N_4O_5S$ requires C, 60.6; H, 6.2; N, 10.1; S, 5.8%).

b. 7β-(D-2-Amino-2-phenylacetamido)-3-(2-cyanoallyl)-ceph-3-em-4-carboxylic Acid, Trifluoroacetic Acid Salt A solution of t-butyl 7β-(D-2-t-butoxycarbonylamino-2-phenylacetamido)-3-(2-cyanoallyl)-ceph-3-em-4-carboxylate (1.57 g.) in trifluoroacetic acid (6.4 ml.) with anisole (1.6 ml.) was kept at 20° for 5 minutes. The solvents were removed in vacuo and the residue partitioned between ethyl acetate and dilute aqueous trifluoroacetic acid. The aqueous phase was washed with ethyl acetate, and ether and, after removal of traces of ether in vacuo, freeze-dried to give an amorphous solid (1.29 g.). Examination by T.L.C. (n-butanol:water = 4:1:5; upper phase) showed that this material was a two-component mixture. The solid was dissolved in trifluoroacetic acid (5.2 ml.) and kept at 20° for 10 minutes. The solvent was removed in vacuo and the residue partitioned as described above. Freeze-drying of the aqueous phase gave the title compound (1.2 g., 82.5%) as an amorphous solid, m.p. ca 140° (decomp.), $[\alpha]_D^{20} + 6.04°$ (c 0.8, acetone), $\lambda_{max.}$ (0.1M- pH 6 phosphate buffer) 260 nm. ($\epsilon$ 8,070), $\nu_{max.}$ (Nujol) ca 3500 ($H_2O$) 2600 to 2700 ($NH_3^+$), 2226 (CN), 1767 (β-lactam), 1680 and 1530 (CONH), and ca 1650 ($CO_2^-$), cm.$^{-1}$, $\tau$ ($CF_3CO_2H$) 2.15 (NH), 2.19 ($NH_3^+$), 2.42 (Ph), 3.77 and 3.91 (C=$CH_2$, two doublets), 4.15 ($C_{(7)}$—H, double doublet, J 4.5 and 9 Hz.), 4.49 ($CHNH_3^+$, ill-resolved AB-quartet), 4.74 ($C_{(6)}$—H, doublet, J 4.5 Hz.), 6.08 and 6.48 ($CH_2C$=$CH_2$, AB-quartet, $J_{AB}$ 15 Hz.) and 6.39 and 6.65 ($C_{(2)}$—$CH_2$, AB-quartet, $J_{AB}$ 18 Hz.) (Found: C, 48.25; H, 3.7; F, 9.6; N, 10.65; S, 6.3. $C_{21}H_{19}F_3N_4O_6S$ ½ $H_2O$ requires C, 48.4; H, 3.65; F, 10.9; N, 10.75; S, 6.15%).

EXAMPLE 7 a. t-Butyl 7β-(D-2-t-Butoxycarbonylamino-2-phenylacetamido)-3-(2-diphenylmethoxycarbonylallyl)ceph-3-em-4-carboxylate A solution of t-butyl 7β-(D-2-t-butoxycarbonylamino-2-phenylacetamido)-3-iodomethylceph-3-em-4-carboxylate (4.72 g., ca 7.5 mmole.) in dry, acid-free, methylene dichloride (15 ml.) was treated with a solution of diphenylmethoxycarbonylmethylenetriphenylphosphorane (7.41 g., ca 15.2 mmole.) in methylene dichloride (25 ml.) and the mixture kept at 20° in the dark overnight. The solution was washed with water and the separated organic phase treated with 40%-aqueous formaldehyde solution (30 ml.) and 2½%-aqueous sodium bicarbonate solution (95 ml). The two-phase system was stirred vigorously, at 20°, for 6 hours. The organic layer was separated and washed with water (2 × 20 ml.), and brine (20 ml.), and dried and evaporated in vacuo. The residual oil in benzene:ethyl acetate = 4:1, was run on to a column of Merck Kieselgel (175 g) and the column eluted with the same solvent. Fractions containing material with similar mobilities on T.L.C. (Rf 0.5 in benzene:ethyl acetate = 5:1). were combined and evaporated in vacuo. A solution of the residual foam, in ether, was run into vigorously stirred petroleum ether to give the crude title compound (1.2 g.) as an amorphous solid, m.p. ca 85° (decomp), $[\alpha]_D^{22} + 5.67°$ (c 1.4, $CHCl_3$), $\lambda_{max.}$ (EtOH) 258.5 nm. ($\epsilon$ 7,450), $\nu_{max.}$ ($CHBr_3$) 3410 (NH), 1780 (β-lactam), 1703 to 1720 ($CO_2R$), and 1695 and 1510 (CONH), $\tau$ ($CDCl_3$) 2.68 (Ph), 3.08 ($CHPh_2$), 3.29 (NH, doublet, J 9 Hz.), 3.54 and 4.39 (C=$CH_2$), 4.29 ($C_{(7)}$—H, double doublet, J 4.5 and 9 Hz.), 4.34 (NHCH, doublet, J 7 Hz.), 4.81 (NHCH, doublet, J 7 Hz.), 5.28 ($C_{(6)}$—H, doublet, J 9 Hz.), 6.56 ($CH_2$—C=$CH_2$), 6.73 and 7.06 ($C_{(2)}$—$CH_2$, AB-quartet, $J_{AB}$ 18 Hz.), 8.56 and 8.62 (t-butyls) (Found: C, 66.3; H, 6.2; N, 5.0; S, 4.4. $C_{41}H_{45}N_3O_8S$ requires C, 66.5; H, 6.1; N, 5.7; S, 4.3%).

b. 7β-(D-2-Amino-2-phenylacetamido)-3-(2-carboxyallyl)ceph-3-em-4-carboxylic Acid, Trifluoroacetic Acid Salt A solution of t-butyl 7β-(D-2-t-butoxycarbonylamino-2-phenylacetamido)-3-(2-diphenylmethoxycarbonylallyl)ceph-3-em-4-carboxylate (1.2 g.) in trifluoroacetic acid (7.0 ml.) was stirred at 22° for 30 minutes. A yellow solid came out of solution during this time. The solvent was removed in vacuo and the solid residue washed with ether. This material was partitioned between ethyl acetate:ether = 3:1 and dilute aqueous trifluoroacetic acid. The aqueous phase was separated and washed with ether and, after removal of traces of ether in vacuo, was freeze-dried to give the title compound (706 mg., 81%) as an amorphous solid, m.p. ca 150° (decomp.), $[\alpha]_D^{22} + 84.15°$ (c 1.0, $H_2O$), $\lambda_{max.}$ (0.1 M-pH 6 phosphate buffer) 261 nm. ($\epsilon$ 8,710), $\nu_{max.}$ (Nujol) 3500 ($H_2O$), ca 2600 ($NH_3^+$), 1760 (β-lactam) 1685 ($CO_2H$), 1670 ($CF_3CO_2^-$) and 1670 and 1520 (CONH) cm.$^{-1}$, $\tau$ ($CF_3CO_2H$) 2.24 ($NH_3^+$), 2.46 (Ph), 3.39 and 4.10 (C=$CH_2$, two singlets), 4.24 ($C_{(7)}$—H, double doublet, not well resolved) 4.50 ($CHNH_3^+$, ill-resolved AB-quartet), 4.80 ($C_{(6)}$—H, doublet, J 4.5 Hz.), 6.26 ($CH_2C$=$CH_2$) and 6.49 and 6.76 ($C_{(2)}$—$CH_2$, AB-quartet, $J_{AB}$ 18 Hz.) (Found: C, 46.0; H, 4.0; F, 9.5; N, 7.45; S, 6.0. $C_{21}H_{20}F_3N_3O_8S$ 1$H_2O$ requires C, 45.9; H, 4.05; F, 10.35; N, 7.65; S, 5.85%).

EXAMPLE 8 t-Butyl 3-(2-ethoxycarbonylbut-2-enyl)-7β-(thien-2-ylacetamido)-ceph-2-em-4ϵ-carboxylate A solution of t-butyl (2-ethoxycarbonyl-2-triphenylphosphoranylideneethyl)(-7β-(thein-2-ylacetamido)-ceph-3-em-4-carboxylate (500 mg.) in methylene dichloride (5 ml.) was treated with acetaldehyde (1.5 ml.) and 2½%-aqueous sodium bicarbonate solution (2.5 ml.), and the mixture was stirred vigorously at 22° for 6½ hours. The organic phase was separated and washed with 2N-hydrochloric acid and water and dried and evaporated in vacuo. The residual orange foam (560 mg.) was dissolved in benzene:ethyl acetate = 2.5:1 and chromatographed on Merck Kieselgel (0.05–0.2 mm., 20 g.). Fractions with similar mobilities on t.l.c. (Rf 0.6 in benzene:ethyl acetate = 2:1) were combined and evaporated in vacuo to give the Δ²-butenyl compound (200 mg.) as an oil in one geometrically isomeric form, $[\alpha]_D^{22} + 249°$ (C 2.0, $CHCl_3$), $\lambda_{inflex.}$ (EtOH) 235.5 nm ($\epsilon$ 14,410), $\nu_{max.}$ ($CHBr_3$) 3356 (NH), 1754 (β-lactam), 1720 ($CO_2R$) and ca. 1680 and 1502 cm.$^{-1}$ (CONH), $\tau$ ($CDCl_3$) 2.92 (C=$CHCH_3$, q, J 7 Hz.), 3.52 (NH, d, J 9 Hz.), 4.22 ($C_{(2)}$—H), 4.37 ($C_{(7)}$—H, dd, J 4.5 and 9 Hz.), 4.74 ($C_{(6)}$—H, d, 4.5 Hz.), 5.30 ($C_{(4)}$—H), 5.83 and 8.76 (ethyl, q and t resp.), 6.19 ($CH_2CONH$), 6.71 and 6.93 ($C_{(3)}$—$CH_2$, AB-q, J 16 Hz.), 8.24 (C=CHCH₃, d, J 7 Hz.), and 8.5 (t-butyl) (Found: C, 56.2; H, 5.85; N, 5.1; S, 11.9. $C_{24}H_{30}N_2O_6S_2$ requires C, 56.9; H, 5.95; N, 5.55; S, 12.65%).

EXAMPLE 9

Tablet

7β-(D-2-Amino-2-phenylacetamido)-3-(2-methoxycarbonylallyl)ceph-3-em-4-carboxylic acid trifluoroacetic acid salt (50 mg) is mixed with polyvinylpyrrolidone (1.4 mg.), icing sugar (18 mg.), and magnesium stearate (0.6 mg.). The mixture is passed through a 60-mesh sieve and fed into the die of a single-punch tabletting-machine with ¼-inch punch and die; the powder is lightly compressed, the die is topped up, and the tablet then punched. The tablet disintegrates within 3 minutes in water at 37°.

EXAMPLE 10

Tablet

In a manner analogous to that described in Example 9 50 mg. of 7β-(D-2-amino-2-phenylacetamido)-3-(2-methoxycarbonylallyl)ceph-3-em-4-carboxylic acid trifluoroacetic acid salt is made up into a tablet with mannitol (19.5 mg.) and magnesium stearate (0.6 mg.).

I claim:

1. A cephalosporin antibiotic compound of the formula

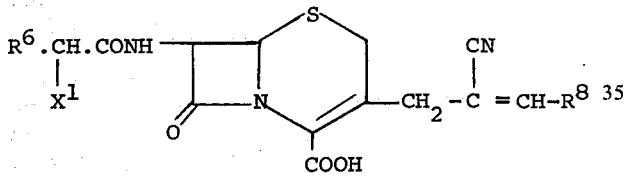

wherein $R^6$ is phenyl; phenyl mono-substituted by halogen, hydroxy, nitro or amino; thien -2- yl or thein -3- yl; $X^1$ is hydrogen, amino, hydroxy, ($c_1$-$C_4$) alkanoyloxy or carboxy and $R^8$ is a hydrogen atom or a $C_1$-$C_8$ alkyl, cyclopropyl, cyclopentyl or cyclohexyl group or a pharmaceutically acceptable salt thereof.

2. A compound as claimed in claim 1 wherein $R^8$ is a hydrogen atom or a $C_1$-$C_8$ alkyl group.

3. A cephalosporin compound of the formula

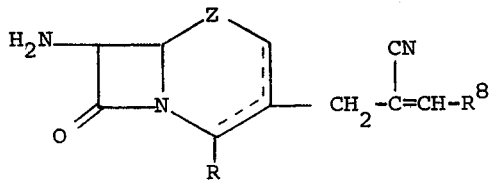

wherein Z is >S or >S→O, R is protected carboxyl and $R^8$ is a hydrogen atom or a $C_1$-$C_8$ alkyl, cyclopropyl, cyclopentyl or cyclohexyl group or an acid addition salt thereof.

4. A compound as claimed in claim 3, wherein $R^8$ is a hydrogen atom or a $C_1$-$C_8$ alkyl group.

5. A compound as claimed in claim 1 wherein the acid $R^6CH(X^1)COOH$ corresponding to the 7-acylamido group is D(-) phenylglycine.

6. A compound as claimed in claim 1 wherein the 3-position group is 2-cyanoallyl.

7. A compound as claimed in claim 1 which is 3-(2-cyanoallyl)-7β-(2-thienylacetamido)ceph-3-em-4-carboxylic acid.

8. A compound as claimed in claim 1 which is 7β-(D-2-amino-2-phenylacetamido)-3-(2-cyanoallyl)ceph-3-em-4-carboxylic acid.

* * * * *